Patented Mar. 15, 1938

2,111,011

UNITED STATES PATENT OFFICE 2,111,011

VAT DYESTUFFS OF THE ANTHRAQUINONE SERIES

Berthold Stein, Mannheim, Germany, assignor to General Aniline Works, Inc., New York, N. Y., a corporation of Delaware No Drawing. Application December 5, 1936, Serial No. 114,337. In Germany December 14, 1935

6 Claims. (Cl. 260—46)

The present invention relates to vat dyestuffs of the anthraquinone series.

I have found that compounds of the anthraquinone series having the general composition

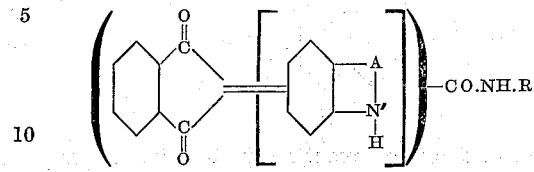

in which A stands for an aromatic radical and R for a radical of the anthraquinone series, are valuable vat dyestuffs. The new dyestuffs may be prepared either by causing halides of monophthaloylcarbazole carboxylic acids to react with amines of the anthraquinone series or by converting halides of monocarboxylic acids of compounds of the azimine series, which are capable of conversion into monophthaloylcarbazoles, first into carboxylic acid amides by reaction with amino compounds of the anthraquinone series, the resulting compounds then being converted into carbazoles by heating whereby nitrogen is split off. The carboxyl group may be present either in the phthaloyl radical or in one of the two benzene nuclei of the carbazole. The dyestuffs are soluble with difficulty in the usual organic solvents and dye vegetable fibres fast shades from the vat.

The following examples will further illustrate how the said invention may be carried out in practice but the invention is not restricted to these examples. The parts are by weight.

Example 1

A mixture of 72 parts of 1.2-phthaloylcarbazole-6-carboxylic acid chloride (obtainable by the reaction of 1-aminoanthraquinone with 4-chlor-3-nitrobenzoic acid ethyl ester, reduction of the nitro group to an amino group, treatment of the amino compound with sodium nitrite and hydrochloric acid, heating the resulting azimino compound with methyldiphenylamine, saponification with aqueous sulphuric acid and treatment of the carboxylic acid with thionyl chloride in the presence of nitrobenzene), 75 parts of 1-amino-5-benzoylaminoanthraquinone and 3000 parts of nitrobenzene is heated at from 160° to 170° C. until hydrogen chloride is no longer split off. The yellow-red crystals thus formed are filtered off by suction while hot and freed from nitrobenzene in the usual manner. A yellow-red powder is thus obtained which dyes cotton clear golden-yellow shades from an orange vat. The dyestuff corresponds to the formula

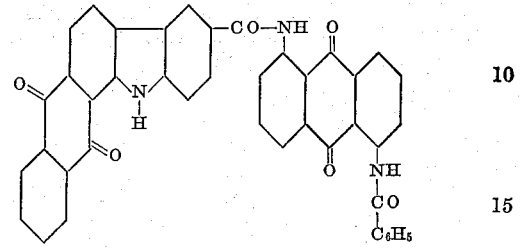

Example 2

A mixture of 66 parts of 1.2-phthaloyl-4-bromcarbazole-6-carboxylic acid chloride (obtainable by the reaction of 1.3-dibrom-2-aminoanthraquonine with 4-aminobenzoic acid ethyl ester, diazotization, heating the azimino compound thus formed with diphenylamine, saponification of the 1.2-phthaloyl-4-bromcarbazole-6-carboxylic acid ethyl ester formed with aqueous sulphuric acid and treatment of the carboxylic acid with thionyl chloride in the presence of nitrobenzene), 3000 parts of nitrobenzene and 57 parts of 1-amino-5-benzoylaminoanthraquinone is heated for some hours at from 150° to 160° C. After temporary dissolution, a pale red-yellow precipitate is deposited after a short time with the evolution of hydrogen chloride. The said temperature is maintained for some time and the dyestuff is then separated in the usual manner. It dyes cotton golden-yellow shades from a yellow-red vat and corresponds to the formula

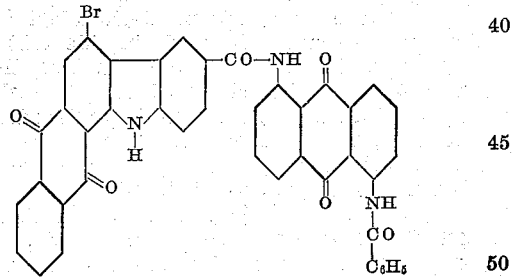

Example 3

A mixture of 44 parts of 1.2-phthalyol-4-brom-carbazole-5-(or 7)-carboxylic acid chloride (obtainable for example from 1.3-dibrom-2-aminoanthraquinone and 3-aminobenzoic acid ethyl ester in a manner corresponding to that described in Example 2), 38 parts of 1-amino-5-benzoylaminoanthraquinone and 1760 parts of nitrobenzene is heated at 150° C. until hydrogen chloride no longer escapes and no further golden yellow needles of the resulting dyestuff separate. The dyestuff separated in the usual manner dyes cotton powerful golden-yellow shades from a violet-brown vat.

Example 4

A mixture of 72 parts of 1.2-phthaloylcarbazole-4-carboxylic acid chloride (obtainable for example by the reaction of 1-brom-2-aminoanthraquinone-3-carboxylic acid ethyl ester with aniline, diazotization, conversion of the azimino compound by heating with diphenylamine into the carbazole and treating the carboxylic acid obtainable therefrom by saponification with alcoholic potash with thionyl chloride), 75 parts of 1-amino-5-benzoylaminoanthraquinone and 3000 parts of nitrobenzene is heated at 160° C. until no further yellow needles of the dyestuff separate. It is freed from solvent in the usual manner, a red-yellow to yellow crystal powder thus being obtained which dyes cotton reddish yellow shades from a red-brown vat. The dyestuff corresponds to the formula

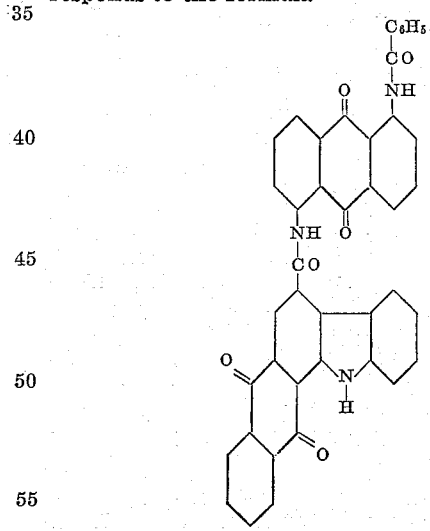

If the aniline in the preparation of the acid chloride be replaced by 1-amino-4-methylbenzene, a dyestuff having very similar tinctorial properties is obtained.

Example 5

A mixture of 59 parts of 1.2-phthaloyl-6-chlorcarbazole-4-carboxylic acid chloride (obtainable for example from 1-brom-2-aminoanthraquinone-3-carboxylic acid and 1-amino-4-chlorbenzene, in a manner corresponding to that described in Example 4), 56 parts of 1-amino-5-benzoylaminoanthraquinone and 2400 parts of nitrobenzene is heated at 160° C. until hydrogen chloride is no longer split off. The dyestuff is then freed from solvent in the usual manner. It dyes cotton yellow-red shades from a brown vat.

Example 6

A mixture of 65 parts of 1.2-phthaloyl-6.7-dichlorcarbazole-4-carboxylic acid chloride (obtainable for example by the reaction of 1-brom-2-aminoanthraquinone-3-carboxylic acid with 1-amino-3.4-dichlorbenzene and conversion of the compound thus formed into the corresponding dichlormonophthaloylcarbazole carboxylic acid chloride in a manner similar to that described in Example 5), 56 parts of 1-amino-5-benzoylaminoanthraquinone and 5000 parts of nitrobenzene is heated for some hours at 160° C. The dyestuff formed is then filtered off and freed, for example by washing with an organic solvent of low boiling point, from adherent nitrobenzene. It dyes cotton reddish yellow shades from a redviolet vat.

Example 7

A mixture of 59 parts of the monophthaloylcarbazole carboxylic acid chloride of the composition:—

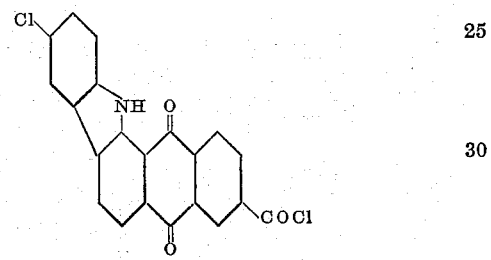

(obtainable by the reaction of 1-aminoanthraquinone-6-carboxylic acid ethyl ester with 1.4-dichlor-2-nitrobenzene and reduction to the amino compound, diazotization to the azimino compound and conversion into the carbazole carboxylic acid ester heating with methyldiphenylamine, saponification of the ester with alcoholic potash and treatment of the acid with thionyl chloride in the presence of nitrobenzene), 56 parts of 1-amino-5-benzoylaminoanthraquinone and 3000 parts of nitrobenzene is heated for some hours at 150° C. The dyestuff is then separated in the usual manner. It dyes cotton deep redorange shades from a brown-violet vat and corresponds to the formula

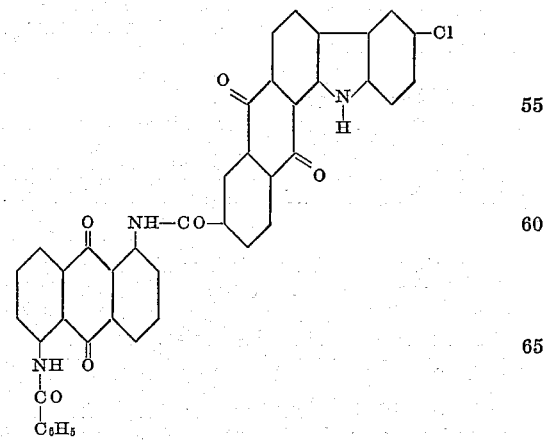

Example 8

A mixture of 54 parts of 1.2-phthaloyl-carbazole-8-carboxylic acid chloride (obtainable by diazotizing 1-chlor-2-aminoanthraquinone and coupling the diazo compound with diethylaniline, reacting with anthranilic acid methyl ester, reducing the resulting compound to the 2-amino-1 - anilidoanthraquinone - 2' - carboxylic ethyl methyl ester, converting it into the azimino compound by treating with sodium nitrite in a weakly acid medium, heating with methyldiphenylamine, saponifying the resulting 1.2-phthaloylcarbazole-8-carboxylic acid methyl ester with an alcoholic potassium hydroxide solution and treating the free acid with thionylchloride in the presence of nitrobenzene), 57 parts of 1-amino-5-benzoylaminoanthraquinone and 1520 parts of nitrobenzene is heated for several hours at from 160° to 170° C. until hydrogen chloride no longer escapes. The resulting orange dyestuff is filtered off by suction from the solution while hot and freed from the solvent in the usual manner. It dyes cotton golden-yellow shades and corresponds to the formula

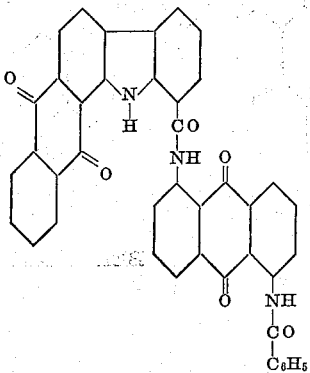

By employing 40 parts of 1-aminoanthraquinone instead of 1-amino-5-benzoylaminoanthraquinone a dyestuff is obtained which dyes cotton yellow shades.

*Example 9*

A mixture of 12 parts of 2.3-phthaloylcarbazole-8-carboxylic acid chloride (obtainable from 2-brom-3-aminoanthraquinone in a manner analogous to that described in Example 8), 12 parts of 1-amino-5-benzoylaminoanthraquinone and 96 parts of nitrobenzene is heated for some hours at about 180° C. The dyestuff is then isolated in the usual manner. It dyes cotton vivid yellow-red shades and corresponds to the formula

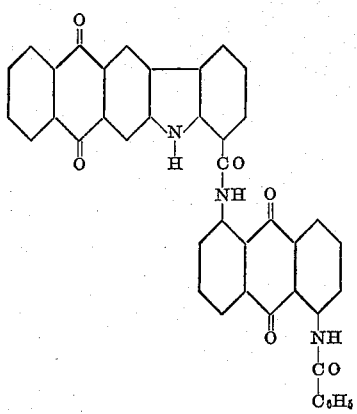

*Example 10*

A mixture of 54 parts of 1.2-phthaloylcarbazole-7-carboxylic acid chloride (obtainable from 1-chlor-2-aminoanthraquinone in the manner described in Example 8 by employing instead of anthranilic acid methyl ester meta-aminobenzoic acid ethyl ester, 3750 parts of nitrobenzene and 57 parts of 1-amino-5-benzoylaminoanthraquinone is heated while stirring at about 150° C. for several hours. The dyestuff which is isolated in the usual manner dyes cotton very fast reddish yellow shades.

Similar dyestuffs giving somewhat more yellowish shades are obtained by employing 1-amino-5-para-chlorbenzoylaminoanthraquinone or 1 - amino-5-(2'5'-dichlorbenzoyl) - aminoanthraquinone instead of 1-amino-5-benzoylaminoanthraquinone.

*Example 11*

A mixture of 54 parts of the carboxylic acid chloride employed as starting material in Example 10, 37 parts of 1-aminoanthraquinone and 3300 parts of nitrobenzene is heated for some time at 170° C. The resulting yellow crystals are filtered off by suction at 120° C. and freed from nitrobenzene in known manner. The dyestuff thus obtained dyes cotton yellow shades.

*Example 12*

A mixture of 5 parts of the acylamine obtainable from 1-amino-5-benzoylaminoanthraquinone and 1 - anthraquinonyl - azimino - benzene-para-carboxylic acid chloride (which is obtainable by reacting 1-aminoanthraquinone with 4-chlor-3-nitrobenzoic acid ethyl ester, reducing the resulting compound in the vat, treating the resulting 1-(2'-amino)-anilidoanthraquinone-4'-carboxylic acid with sodium nitrite in the presence of glacial acetic acid and preparating the acid chloride by means of sulphuryl chloride in the presence of nitrobenzene) and 50 parts of methyldiphenylamine is heated at from 250° to 260° C. until nitrogen no longer escapes. The dyestuff is then filtered off and freed from the solvent in the usual manner. It is identical with the dyestuff described in Example 1.

What I claim is:—

1. Vat dyestuffs of the anthraquinone series corresponding to the general formula

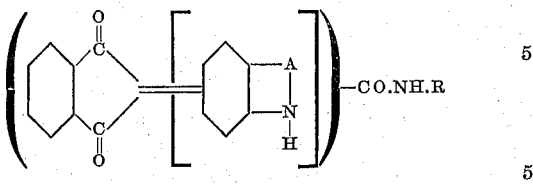

in which A stands for a benzene ring, and R for a radical of the anthraquinone series.

2. Vat dyestuffs of the anthraquinone series corresponding to the general formula

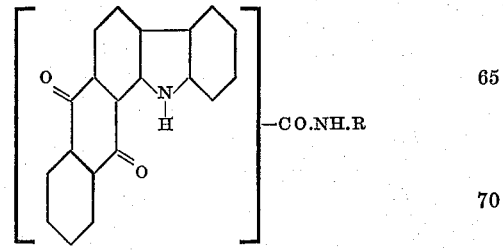

in which R stands for a radical of the anthraquinone series.

3. Vat dyestuffs of the anthraquinone series corresponding to the general formula
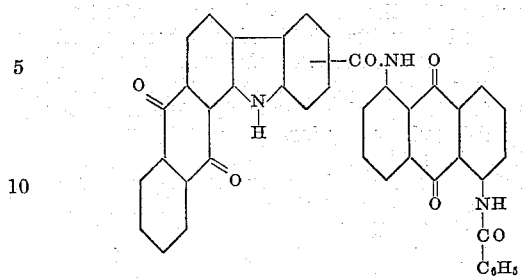
4. The vat dyestuff of the anthraquinone series corresponding to the formula
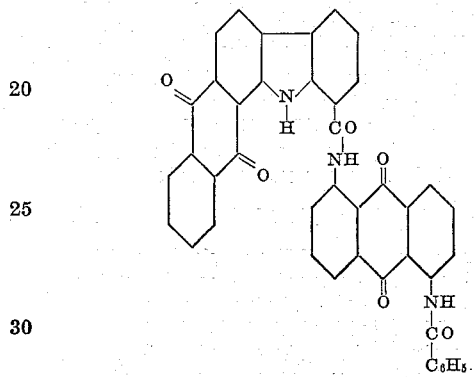
5. The vat dyestuff of the anthraquinone series corresponding to the formula
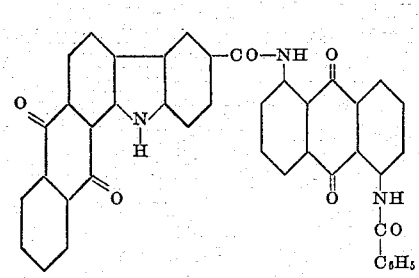
6. The vat dyestuff of the anthraquinone series corresponding to the formula
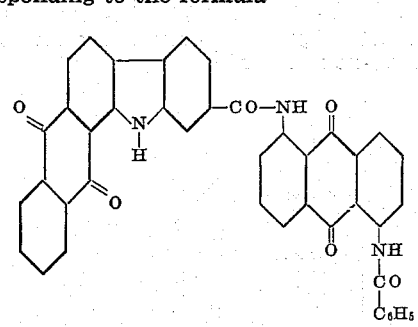
BERTHOLD STEIN.